United States Patent
Szlosek

(10) Patent No.: US 7,531,140 B2
(45) Date of Patent: May 12, 2009

(54) MULTIWELL PLATE HAVING TRANSPARENT WELL BOTTOMS AND METHOD FOR MAKING THE MULITIWELL PLATE

(75) Inventor: Paul M. Szlosek, Kennebunk, ME (US)

(73) Assignee: Corning Incorporated, Corning, NY (US)

( * ) Notice: Subject to any disclaimer, the term of this patent is extended or adjusted under 35 U.S.C. 154(b) by 155 days.

(21) Appl. No.: 11/448,368

(22) Filed: Jun. 6, 2006

(65) Prior Publication Data

US 2007/0154357 A1    Jul. 5, 2007

Related U.S. Application Data

(60) Provisional application No. 60/755,475, filed on Dec. 29, 2005.

(51) Int. Cl.
*B01L 3/00* (2006.01)

(52) U.S. Cl. ...................................... 422/102
(58) Field of Classification Search ................. 422/102
See application file for complete search history.

(56) References Cited

U.S. PATENT DOCUMENTS

| | | | |
|---|---|---|---|
| 4,240,751 A * | 12/1980 | Linnecke et al. ............ 356/409 |
| 5,487,872 A * | 1/1996 | Hafeman et al. ............ 422/102 |
| 2004/0032093 A1 | 2/2004 | Razavi ........................ 277/628 |
| 2005/0170498 A1* | 8/2005 | Dolley et al. ............. 435/288.4 |
| 2005/0173059 A1 | 8/2005 | Ringleben et al. ........... 156/291 |

* cited by examiner

*Primary Examiner*—Walter D Griffin
*Assistant Examiner*—Bobby Ramdhanie
(74) *Attorney, Agent, or Firm*—Thomas R. Beall

(57) ABSTRACT

A multiwell plate is described that is used for assaying samples and is made from a plastic upper plate which forms the sidewalls of one or more wells and a transparent lower plate which forms the bottom walls of the wells. The upper plate and lower plate are attached and bound to one another by a series of rings. Also described herein is a method for making such multiwell plates.

8 Claims, 3 Drawing Sheets

MULTIWELL PLATE HAVING TRANSPARENT WELL BOTTOMS AND METHOD FOR MAKING THE MULITIWELL PLATE

CROSS-REFERENCE TO RELATED APPLICATIONS

This application claims the benefit of U.S. Application Ser. No. 60/755,475 filed on Dec. 29, 2005 and entitled "Multiwell Plate Having Transparent Well Bottoms And Method For Making The Multiwell Plate" which is incorporated by reference herein in.

BACKGROUND OF THE INVENTION

1. Field of the Invention

The present invention relates in general to the biotechnology field and, in particular, to a multiwell plate made from a plastic upper plate and a transparent bottom plate that are joined to one another.

2. Description of Related Art

The recent growth in many areas of biotechnology has increased the demand to perform a variety of studies, commonly referred to as assays, of biochemical systems. These assays include for example, biochemical reaction kinetics, DNA melting point determinations, DNA spectral shifts, DNA and protein concentration measurements, excitation/emission of fluorescent probes, enzyme activities, enzyme co-factor assays, homogeneous assays, drug metabolite assays, drug concentration assays, dispensing confirmation, volume confirmation, solvent concentration, and solvation concentration. Also, there are a number of assays which use intact living cells that require visual examination.

Assays of biochemical systems are carried out on a large scale in both industry and academia, so it is desirable to have an apparatus that allows these assays to be performed in a convenient and inexpensive fashion. Because they are relatively easy to handle, are low in cost, and generally disposable after a single use, multiwell plates are often used for such studies. Multiwell plates are typically formed from a polymeric material and consist of an ordered array of individual wells. Each well includes sidewalls and a bottom so that an aliquot of sample can be placed within each well. The wells may be arranged in a matrix of mutually perpendicular rows and columns. Common sizes for multiwell plates include matrices having dimensions of 8×12 (96 wells), 16×24 (384 wells), and 32×48 (1536 wells).

The materials used to construct a multiwell plate are selected based on the samples to be assayed and the analytical techniques to be used. For example, the materials of which the multiwell plate is made should be chemically inert to the components of the sample or any biological or chemical coating that has been applied to the multiwell plate. Further, the materials should be impervious to radiation or heating conditions to which the multiwell plate is exposed during the course of an experiment and should possess a sufficient rigidity for the application at hand.

In many applications, a transparent window in the bottom of each well is needed. Transparent bottoms are primarily used in assay techniques that rely on emission of light from a sample within the well and subsequent spectroscopic measurements. Examples of such techniques include liquid scintillation counting and techniques which measure light emitted by luminescent labels, such as bioluminescent or chemiluminescent labels, fluorescent labels, or absorbance labels. Optically transparent bottom wells also enable microscopic viewing of specimens and living cells within the well. Currently, optically transparent and ultraviolet transparent bottomed multiwell plates exist in the market and are used for the aforementioned purposes. These multiwell plates are typically made from a hybrid of different polymeric materials, one material making up the sidewalls of the wells and another material making up the bottom walls of the wells.

Preferably, multiwell plates that are used for spectroscopic and microscopic measurements would have well bottoms made from glass. Glass has the advantage of being chemically inert, has superior optical properties in the visible range, is rigid, and is highly resistant to any deformation process caused by heating, due to its high melting temperature. Further and unlike most polymers, glass can be formulated and processed to provide a surface which produces very little background signal (barring absorbance) and which may be manufactured to extreme smoothness. While it is simple to make glass in sheets, it is not possible to injection mold articles made from glass, and it is extremely difficult to press a molten gob of glass into an industry standard multiwell plate format. A solution to the problem is to join a plastic upper plate that forms the sidewalls of the wells of a microplate to a substantially flat transparent glass lower plate that forms the bottom walls of the wells. One commonly employed method of joining a plastic upper plate and a glass lower plate to one another is to use an adhesive. Unfortunately, the multiwell plate that uses an adhesive to bond together the plastic upper plate and glass lower plate does not perform well under normal cell culture conditions. In particular, adhesive migration into the test wells is particularly troublesome as the presence of adhesive in the work area of the optical bottom surface of the well may potentially alter the assay results. Additionally, the presence of adhesive in the interior of the wells may interfere with the creation and reading of microassays, cell adhesion and growth, and binding and assaying of nucleic acids, proteins, and other biological or chemical agents. Adhesives which are UV cured or UV stabilized also have the tendency to absorb UV light, which may result in altering fluorescent readings taken from a detector located above or below the respective well. Accordingly, there is a need for a multiwell plate that has a strong adhesive bond between the plastic upper plate and the glass lower plate, but does not encounter the problem of adhesive migration into the test well. This need and other needs are satisfied by the multiwell plate and the method of the present invention.

BRIEF DESCRIPTION OF THE INVENTION

The present invention includes a multiwell plate that is used for assaying samples and is made from a plastic upper plate which forms the sidewalls of one or more wells and a transparent lower plate which forms the bottom walls of the wells. The plastic upper plate and transparent lower plate are attached and bound to one another by an adhesive. The upper plate contains a plurality of raised rings elevated above a bottom surface and circumscribing each well such that when the upper plate and lower plate are joined, the contact zone between the two plates is defined by the communication of the raised rings of the upper plate and the planar surface of the lower plate. The present invention also includes a method for making such multiwell plates.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
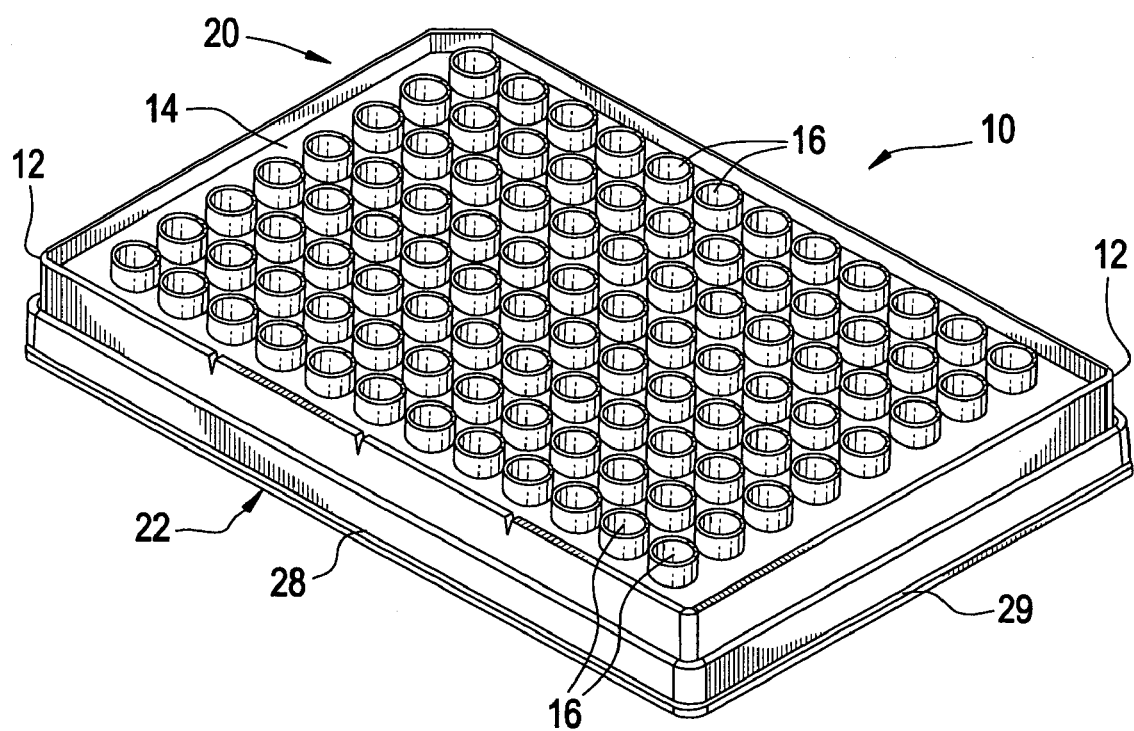
FIG. 1 is a perspective view of a multiwell plate in accordance with the present invention.

Referring to FIG. 1, there is illustrated a perspective view of an exemplary multiwell plate 10 of the present invention. The multiwell plate 10 (e.g., microplate) includes a peripheral skirt 12 and a top surface 14 having an array of wells 16 each of which is capable of receiving an aliquot of sample to be assayed. Preferably, the multiwell plate 10 conforms to industry standards for multiwell plates; that is to say, the multiwell plate 10 is bordered by a peripheral skirt 12, laid out with ninety-six wells 16 in an 8×12 matrix (mutually perpendicular 8 and 12 well rows). In addition, the height, length, and width of the multiwell plate 10 preferably conform to industry standards. However, the present invention can be implemented in a multiwell plate that has any number of wells and is not limited to any specific dimensions and configurations.

Figure 2:
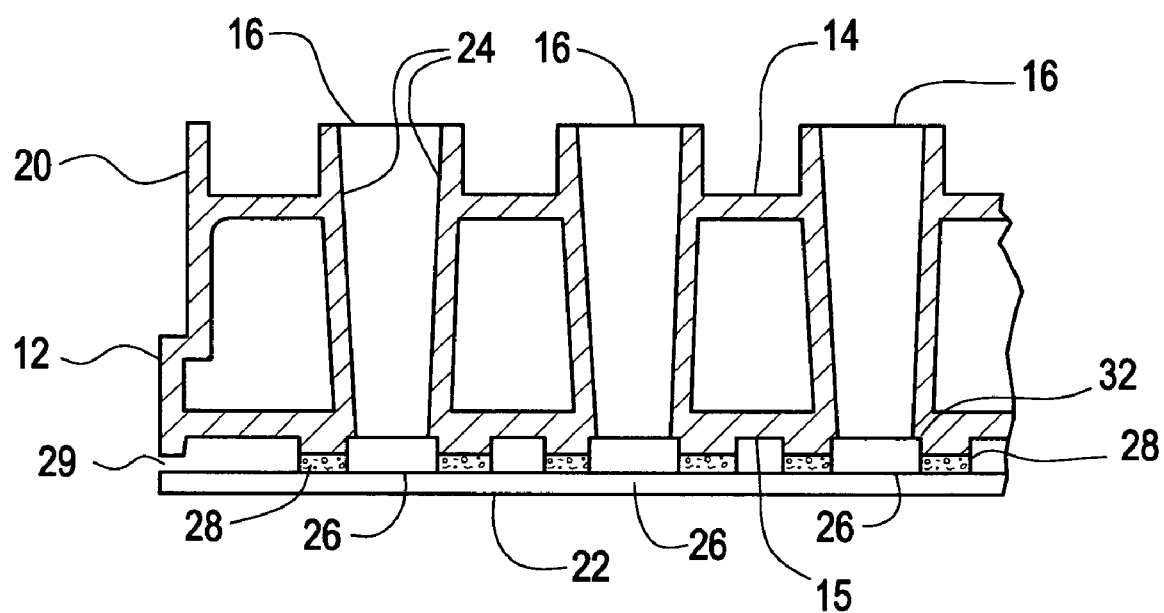
FIG. 2 is a cross-sectional side view of the multiwell plate shown in FIG. 1.

Referring to FIG. 2 there is illustrated a partial cross sectional view of the multiwell plate 10 shown in FIG. 1. The multiwell plate 10 is of two-part construction including an upper plate 20 and a lower plate 22. The upper plate 20 forms the peripheral skirt 12, the top surface 14, bottom surface 15, and the sidewalls 24 of the wells 16. The lower plate 22 forms the bottom wells 26 of the wells 16. During the manufacturing process, the upper plate 20 and lower plate 22 are joined together at an interface by an adhesive 28. For clarity, a more detailed discussion about the manufacturing process is provided below after a brief discussion about the exemplary structures of the multiwell plate 10.

The upper plate 20 includes a frame that forms the sidewalls 24 of an array of open-ended sample wells 16 in addition to the peripheral skirt 12, bottom surface 15 and the top surface 14. The upper plate 20 is preferably molded from a polymeric material (e.g., polystyrene) that becomes intertwined upon heating and bonds together in a non-covalent mechanism upon cooling, thereby forming an interpenetrating polymer network. Further, the upper plate 20 need not be molded, instead the upper plate 20 can be laminated so that each layer has desired properties. For example, a top most layer may be anti-reflective, a middle layer may form the sidewalls of the wells and can be hydrophobic for meniscus control, and the bottommost layer may be a polymeric material.

The lower plate 22 is preferably made from a layer of glass material that can be purchased from a variety of manufacturers (e.g. Erie Scientific, Corning, Inc.) as a sheet. Alternatively, the lower plate may be made from a polymer or polymer film. Exemplary polymer materials for use in the lower plate include polyolefins, fluoropolymers, polyesters, non-aromatic hydrocarbons, cyclic olefin copolymers, polystyrenes and any other of a number of polymers known to those of skill in the art and suitable for particular intended purposes. This plate can then be altered to fit the dimensions of the desired size multiwell plate 10. The glass or polymer material forms a transparent bottom wall 26 for each sample well 16 and permits viewing therethrough. The transparent lower plate 22 also allows for light emissions to be measured through the bottom walls 26 of the wells 16. As shown, the lower plate 22 is substantially flat and is sized to form the bottom walls 26 for all of the wells 16 of the upper plate 20. It should be noted that one or more chemically active coatings (not shown) can be added to a top surface of the bottom walls 26 of the wells 16.

Although the lower plate 22 as a whole is substantially flat, it may have relief features formed upon its surface such as ridges, curves, lens, raised sections, diffraction gratings, dimples, concentric circles, depressed regions, etc. Such features may be located on the lower plate 22 such that they shape or otherwise become features of the bottom walls 26 themselves, and may in turn enhance the performance of an assay, enhance or enable detection (as in the case with lenses and gratings), or serve to mechanically facilitate bonding with the upper plate 20. These relief features may be formed by any number of known methods including vacuum thermoforming, pressing, or chemical etching, laser machining, abrasive machining, embossing, or precision rolling.

Each well 16 includes sidewalls 24 and a bottom wall 26. To prevent light transmission between adjacent wells 16, the sidewalls 24 are preferably formed from an opaque organic polymeric material or filled with an inorganic $TiO_2$ material. For assaying techniques which require the detection of very small amounts of light, as in liquid scintillation counting, the pigmentation used to render the plastic upper plate 20 opaque is preferably light in color (e.g. white) so as to be highly reflective and non-absorptive to ensure high counting efficiency with respect to radioactive samples. The white coloration is typically achieved with $TiO_2$. However the sidewalls 24 may be optically transparent. In some types of luminescence and fluorescence assays, it is preferred that the sidewalls 24 of the wells 16 be non-reflective and absorptive, in which case the sidewalls 24 are formed from a black pigmented polymer. As is commonly known and practiced, the black coloration of the polymer may be achieved by the addition of a pigment material such as carbon black to the polymer blend at concentrations readily known and practiced in the art.

As described above, the bottom wall 26 of a well 16 is formed from a transparent material. Preferably, the transparent material is an inorganic such as glass, but may be pure silica, mica, or even metallic coated films. More preferably, the glass is of a high optical quality and flatness such as boroaluminosilicate glass (Corning Inc. Code 1737). Optical flatness of the bottom walls 26 of the wells 16 is important particularly when the multiwell plate 10 is used for microscopic viewing of specimens and living cells within the wells 16. This flatness is also important in providing even cell distribution and limiting optical variation. For example, if the bottom wall 26 of a well 16 is domed, the cells will tend to pool in a ring around the outer portion of the bottom 26. Conversely, if the bottom wall 26 of a well 16 is bowed downwards, the cells will pool at the lowest point. Glass microscope slides are typically flat within microns to ensure an even distribution. Preferably, the bottom walls 26 of the wells 16 are formed from a glass sheet having a thickness similar to microscope slide cover slips, which are manufactured to match the optics of a particular microscope lens. Although the bottom walls 26 may be of any thickness, for microscopic viewing it is preferred that the bottom wall 26 thickness is less than or equal to 500 microns and their flatness is in the range of 0-10 microns across the diameter of the outer bottommost surface of an individual well 16.

Moreover, the wells 16 can be any volume or depth, but in accordance with the 96 well industry standard, the wells 16 preferably have a volume of approximately 300 ul and a depth of approximately 12 mm. Spacing between wells 16 is approximately 9 mm between center lines of rows in the x and y directions. The overall height, width, and length dimensions of the multiwell plate 10 are preferably standardized at 14 mm, 85 mm and 128 mm, respectively. Wells 16 can be made in any cross sectional shape (in plan view) including, square sidewalls 24 with flat or round bottoms, conical sidewalls 24 with flat or round bottoms, and combinations thereof.

Figure 3:
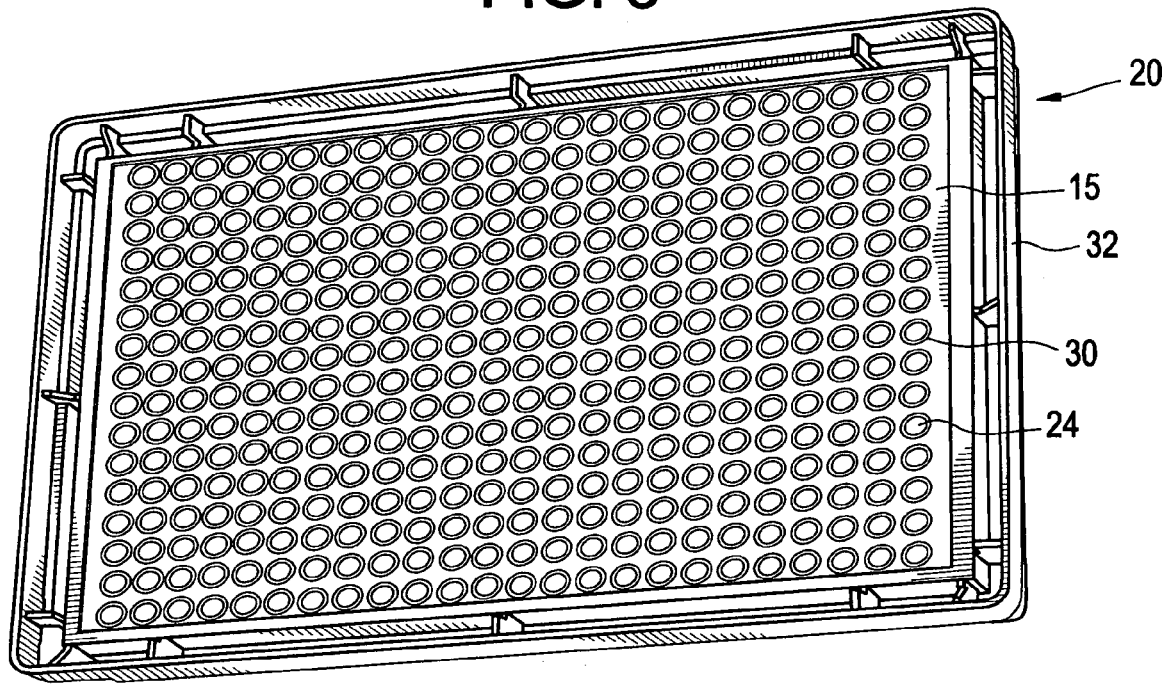
FIG. 3 is a perspective view of an upper plate portion of the multiwell plate of the present invention.
Figure 4:
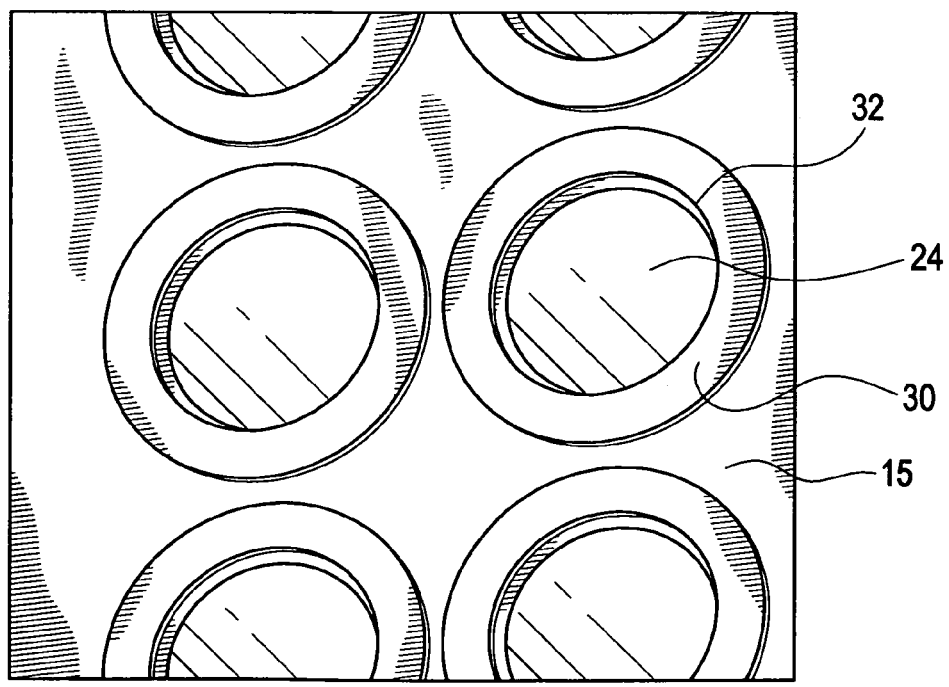
FIG. 4 is a perspective partial view of a portion of the upper plate portion shown in FIG. 3.

Referring to FIGS. 3 and 4, an upper plate 20 framed by skirt 12 and exhibiting an array of 96 open ended wells 16 is shown. Raised above a substantially flat bottom surface and circumscribing each well is a raised ring 30. Each ring 30 is uniformly raised approximately 0.10-0.15 millimeters above the bottom surface 15, although any height may be employed. The rings 30 are intended to engage with a bonding surface of the lower plate 22. As such, it is preferred that during the bonding process, the surface of the rings 30 are coated with an adhesive material 28 such as a cationic epoxy such as Loctite 3337 or Loctite 3340 (Henkel Corp., Rocky Hill, Conn.) or Dymax 3012 (Dymax Corp., Torrington, Conn.). The contact region of the ring 30 has a width of between approximately 0.58-0.62 mm for a 96 well plate design, but may be any width and will vary depending on the density of wells 16. The interior circumference of the rings 30 are preferably slightly offset from the actual intersection of the well walls 24 and the bottom surface 15. This creates a step 32 within the interior circumference of the ring structure. This offset or step 32 allows for a pooling area for adhesive 28 that may be pushed toward the well 16 during assembly, but will not interfere with the optical path of the well 16. For a 96 well design, the interior circumference of the rings 30 are set back from the actual interaction of the well walls 24 and the bottom surface 15 a distance of approximately 0.10-0.14 mm, although the distance may be adjusted depending on configuration and amount and type of adhesive 28 used. Preferably, a similar raised area will not circumscribe the perimeter of the upper plate 20, nor will the raised rings 30 connect to one another. As such, sealing will occur only around individual wells 16 resulting in minimal adhesive 28 usage and flatter assembly to the glass or polymer lower plate 22 will occur. Since rings 30 are not interconnected and no circumferential ring exists around the periphery of the upper plate 20, air pressure can not build up in the gap 29 formed between the upper and lower plates 20 and 22 during an adhesive curing or welding process. Consequently, a space 29 approximately equal to the height of the rings 30 above the bottom surface 15 is formed between the skirt 12 and the lower plate 22.

The preferred process of manufacturing the multiwell plate 10 of the present invention includes applying a UV curable adhesive 28 to join the upper plate 20 and the lower plate 22. An adhesive 28 is applied only to the aforementioned raised ring structures 30 of the upper plate 20 by any variety of means including screen printing, rotary screen, flexographic, pad printing, or dry transfer techniques. Once the adhesive 28 is properly applied, the upper and lower plates 20 and 22 are joined such that the raised ring 30 features contact the substantially flat surface of the lower plate 22. The raised ring 30 provides a wicking path for the adhesive 28 to follow in order to completely "wet out" the seal area prior to sealing, meaning that the adhesive 28 follows the ring 30 around the seal area helping to fill any voids in the adhesive layer, assuring a uniform coverage. The adhesive material 28 (e.g. cationically photocurable adhesives such as Loctite 3337 and Loctite 3340) is cured by ultraviolet light and has a maximum absorption in the range of 350 to 380 nanometers. For instance, the energy required to perform a full cure is approximately 4.5 Joules/$cm^3$ of long wavelength ultraviolet light, but may vary based on temperature and humidity conditions. Some of the light sources that can be used to cure typical UV adsorptive adhesives 28 include sunlight, mercury lamps and fluorescent black lights. Initial curing occurs under concentrated light source in approximately 4 seconds, however, the adhesive 28 continues to "dark cure" over several weeks. The adhesive 28 invariably shrinks slightly during the curing process. However, since the adhesive 28 utilized is limited to the discrete raised rings 30, the adhesive 28 shrinkage has limited influence on the final contour of the cured assembly.

When a welding operation is used to fuse the lower plate 22 to the upper plate 20, the raised ring structure 30 acts as a local concentrator for the force being applied and thus ensures an integral test seal. Welding of the two components may be performed by laser welding utilizing Laser IRAM Welding System (Branson Ultrasonics Corporation, Danbury, Conn.).

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A multiwell plate for use in assaying samples, comprising:
    a frame that forms sidewalls of a plurality of wells, the frame having a top surface that interconnects said wells, the frame having a bottom surface that interconnects said wells, where the top surface is separated from the bottom surface;
    at least one raised ring extending from said bottom surface of said frame and circumscribing at least one of said wells;
    a layer that forms a bottom wall of the at least one well, the layer having a top surface, wherein said frame and said layer are attached such that said top surface of said layer contacts and bonds to said raised ring.

2. The multiwell plate of claim 1, wherein said frame and said layer are attached and bound to one another by an adhesive.

3. The multiwell plate of claim 1, wherein each said well is circumscribed by said raised ring.

4. The multiwell plate of claim 3, wherein said rings are independent of one another and do not overlap or intersect.

5. The multiwell plate of claim 1, wherein said frame further comprises a peripheral skirt having a lower rim.

6. The multiwell plate of claim 5, wherein said lower rim does not contact said layer along its entire periphery, thereby allowing open communication between an outside environment and a gap between said upper plate and said lower plate.

7. The multiwell plate of claim 1, further comprising a step as defined by a relatively larger inner circumference of said raised ring and a relatively smaller circumference of said well.

8. The multiwell plate of claim 1 whereby said raised ring is set back from said well a predetermined distance thereby creating a step along the bottom surface bounded by an internal circumference of said raised ring and a circumference of said well.

* * * * *